United States Patent Office 2,997,382
Patented Aug. 22, 1961

2,997,382
N-HALOALKENYL DITHIOCARBANILATES FOR THE CONTROL OF UNDESIRABLE VEGETATION
Marion W. Harman and John J. D'Amico, Nitro, W. Va., assignors to Monsanto Chemical Company, St. Louis, Mo., a corporation of Delaware
No Drawing. Filed Apr. 7, 1958, Ser. No. 726,603
17 Claims. (Cl. 71—2.6)

The present invention relates to a new class of dithiocarbamates and to methods for making them. More particularly the invention relates to esters of N-haloalkenyldithiocarbamic acids.

Dithiocarbamates, as are known, all contain the characteristic and common grouping

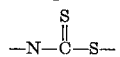

The compounds of the present invention are characterized by the presence of one cyclic group as well as a halogen substituted alkenyl group attached to the nitrogen of this characteristic group. The new compounds comprised in the present invention may be represented schematically by the following general formula

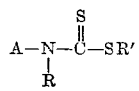

where A represents an aryl radical and R represents a halogen substituted alkenyl group and R' represents a non-aromatic ester radical. Typical examples of A are phenyl, p-chlorophenyl, o-chlorophenyl, m-bromophenyl, 2,4-dichlorphenyl, 2,4,5-trichlorophenyl, 2,6-dichlorophenyl, o-tolyl, p-tolyl, m-tolyl, 2,3,6-trichlorophenyl, 2,5-dibromophenyl, m-fluorophenyl and p-iodophenyl.

The radical designated R may be selected from a variety of halogen substituted alkenyl radicals but is preferably a halogen substituted lower alkenyl group as for example 2-chloroallyl, 2-bromoallyl, 3-chloroallyl, 3-iodoallyl, 2-fluoro-3-choroallyl, 3-bromo-2-butenyl, 2,3-dichloroallyl, 3,3-dichloroallyl, 2,3-dichloro-2-butenyl, 2,3-diodo-2-butenyl and 2,3-dichloro-4-bromobutenyl. The ester radical designated as R' may be the same as R or may be lower alkyl or lower alkenyl. In general, any non-aromatic ester radical including particularly lower allyl and lower alkenyl radicals is suitable. Examples are methyl, ethyl, propyl, isopropyl, butyl, isobutyl, amyl, allyl and cyclohexenyl. The invention will be fully understood and apparent from the detailed examples which follow.

EXAMPLE 1

Into a reactor was charged 61 grams of N-2-chloroallyl 3,4-dichloroaniline, 60 ml. of ethyl alcohol, and 30 grams concentrated ammonium hydroxide. The solution was stirred at to it added 33 grams of carbon bisulfide in one portion. The reaction mixture was held at 25–30° C. for one hour and 42.6 grams of methyl iodide added in one portion. The reaction mixture was stirred at 25–30° C. for 24 hours then 400 ml. of water added and the reaction mixture was extracted with 400 ml. of ethyl ether. The ether solution was washed with dilute hydrochloric acid until the aqueous layer did not yield any amine upon neutralization with 25% sodium hydrochloride, then washed with water until neutral to litmus, dried over sodium sulfate and the ether removed in vacuo at maximum temperature of 80–90° C. at 1–2 mm. There was obtained 78.5% yield of methyl N-2-chloroallyl 3,4-dichlorodithiocarbanilate, an amber oil.

Substituting 33.3 grams of 2,3-dichloro-1-propene, 23.0 grams of allyl chloride and 31.1 grams of 2-bromo-3-chloro-1-propene respectively for the methyl iodide and 54.5 grams of N-(3-chloro-2-butenyl)aniline for N-(2-chloroallyl) 3,4-dichloroaniline and 33.3 grams of 2,3-dichloro-1-propene for the methyl iodide in the foregoing procedure yielded the following products.

*Table 1*

| Product | Physical Appearance | Analysis | |
|---|---|---|---|
| | | Calcd. | Found |
| 2-Chloroallyl N-(2-chloroallyl) 3,4-dichlorodithiocarbanilate. | amber oil | Percent N__ 3.6<br>Percent S___ 36.6 | 4.1<br>35.6 |
| Allyl N (2-chloroallyl)-3,4-dichlorodithiocarbanilate. | ___do___ | Percent N__ 4.0 | 4.7 |
| 2-Bromoallyl N-(2-chloroallyl)-3,4-dichlorodithiocarbanilate. | ___do___ | Percent N___ 3.3 | 4.7 |
| 2-Chloroallyl N-(3-chloro-2-butenyl)-dithiocarbanilate. | ___do___ | Percent N___ 4.2 | 4.2 |

The new compounds disclosed herein possess a high degree of biological activity. For example, the class comprise an effective group of grass-specific herbicides. In general the presence of an aryl radical on the nitrogen of a dithiocarbamate detracts from utility as herbicides but the new class are exceptional.

In general the compounds effectively control vegetation by application thereto by which is meant either application to the soil whereby the toxicant is brought into contact with germinating seedlings or to foliage. The compounds are particularly valuable as pre-emergent herbicides wherein the toxicant is applied to the soil before weeds and other plants emerged. The toxicants may be applied conveniently in the form of a spray containing the active ingredient within the range of 0.1–5%. For pre-emergence application amounts within the range of 1 to 60 pounds per acre are recommended. The active components are insoluble in water but they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents. The herbicides may be formulated and applied as dry compositions by mixing the toxicant with a finely divided solid carrier, as for example talc, clay, pyrophyllite, silica and fuller's earth. Alternatively, the dry composition may be dispersed in water and applied as a spray.

The table below illustrates the pre-emergent herbicidal activity of the new compounds. In these tests the ester was emulsified in water and the emulsion applied as a spray. The active ingredient at 25 pounds per acre was applied to the soil of seeded plots before the grass or other plants emerged. For convenience in recording the data the following rating key was employed.

0—No phytotoxicity.
1—Slight phytotoxicity.
2—Moderate phytotoxicity.
3—Severe phytotoxicity.

The plants are represented by letter as follows:

A. Morning glory
B. Wild oat
C. Brome-cheat grass
D. Rye grass
E. Buckwheat
F. Radish-mustard
G. Sugar-beet
H. Cotton
J. Corn
K. Foxtail
L. Barnyard
M. Crab grass
N. Field bindweed
O. Pigweed

Table II

| Active Ingredient | A | B | C | D | E | F | G | H | J | K | L | M | N | O |
|---|---|---|---|---|---|---|---|---|---|---|---|---|---|---|
| Methyl N-(2-chloroallyl)3,4-dichlorodithiocarbanilate | 3 | 3 | 3 | 3 | 2 | 1 | 3 | 1 | 0 | 3 | 3 | 3 | 1 | 3 |
| 2-Chloroallyl N-(2-chloroallyl)3,4-dichlorodithiocarbanilate | 0 | 3 | 3 | 3 | 2 | 1 | 3 | 1 | 3 | 3 | 3 | 3 | 0 | 3 |
| 2-Bromoallyl N-(2-chloroallyl)-3,4-dichlorodithiocarbanilate | 0 | 3 | 3 | 3 | 0 | 1 | 3 | 0 | 0 | 3 | 3 | 3 | 0 | 3 |
| Allyl N-(2-chloroallyl)-3,4-dichlorodithiocarbanilate | 0 | 3 | 2 | 3 | 0 | 0 | 3 | 0 | 0 | 3 | 3 | 3 | 0 | 3 |

Toxicity to foliage was demonstrated by spraying the foliage of grass, bean and a mixture of broadleaf plants with an aqueous spray containing 0.5% of the toxic ingredient. The results employing the same numerical rating system are recorded below.

Table III

| Active Ingredient | Phytotoxicity | | |
|---|---|---|---|
| | Grass | Bean | Broadleaf |
| Methyl N-(2-chloroallyl)3,4-dichlorodithiocarbanilate | 2 | 3 | 3 |
| 2-Chloroallyl N-(2-chloroallyl)3,4-dichlorodithiocarbanilate | 2 | 2 | 2 |
| 2-Bromoallyl N-(2-chloroallyl)-3,4-dichlorodithiocarbanilate | 1 | 3 | 3 |
| Allyl N-(2-chloroallyl)-3,4-dichlorodithiocarbanilate | 2 | 3 | 2 |

As illustrative of the toxicity to nematodes an experiment was conducted by preparing a suspension of the nematode Panagrellus redivivus in water and observing through a microscope the motility of the organism in the presence of N-2-chloroallyl 3,4-dichlorodithiocarbanilate. A control experiment was run at the same time in which no toxicant was employed. The nematode in aqueous suspension will flex its body at a regular rate and as the nematocide takes effect, the rate of flexing decreases until death of the parasite occurs. The control experiment showed undiminished activity after 24 hours whereas the motility was only 5% of the original in the presence of 0.1% of the toxicant.

The new compounds comprise compounds toxic to fungi which retain their toxicity in the presence of soil. They are therefore valuable for destroying other pathogenic organisms besides nematodes present in soil. At a concentration of 100 p.p.m. 2-bromoallyl N-2-chloroallyl 3,4-dichlorodithiocarbanilate and allyl N-2-chloroallyl 3,4-dichlorodithiocarbanilate were toxic to damping off organisms present in soil. In microbiological testing these compounds and methyl 2-chloroallyl 3,4-dichlorodithiocarbanilate prevented the growth of Micrococcus pyogenes var. aureus and Aspergillus niger at concentrations of 10 p.p.m. The toxicity to microorganisms was retained in the presence of soap rendering the compounds useful as antiseptics in alkali metal higher fatty acid salt detergent soaps. Still further biological activity was demonstrated in tests against insect pests. 100% kill of yellow mosquito larvae was achieved with 0.001% concentrations of 2-chloroallyl N(3-chloro-2-butenyl) dithiocarbanilate, methyl N-(2-chloroallyl) 3,4-dichlorodithiocarbanilate, 2-chloroallyl N(2-chloroallyl) 3,4-dichlorodithiocarbanilate, 2-bromoallyl N-(2-choroallyl) 3,4-dichlorodithiocarbanilate and allyl N-(2-chloroallyl) 3,4-dichlorodithiocarbanilate.

It is intended to cover all changes and modifications of the examples of the invention herein chosen for purposes of disclosure which do not constitute departures from the spirit and scope of the invention.

This application is a continuation-in-part of our co-pending application Serial No. 474,984, filed December 13, 1954, now U.S. 2,854,467, granted April 30, 1958.

What is claimed is:

1. A compound of the structure

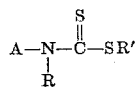

where A represents an aryl group selected from the group consisting of phenyl and halogen substituted phenyl, R represents a halogen substituted lower monoolefinic group and R' is a radical selected from the group consisting of lower alkyl, lower monoolefinic and halogen substituted lower monoolefinic.

2. A compound of the structure

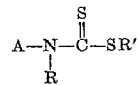

where A represents chloro substituted phenyl, R represents a hologen substituted lower mono-olefinic radical and R' represents a lower alkyl radical.

3. A compound of the structure

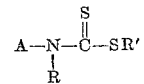

where A represents a halogen substituted phenyl group, R represents a halogen substituted lower mono-olefinic radical and R' represents a lower monoolefinic radical.

4. A compound of the structure

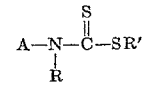

where A represents a dichlorophenyl radical, R represents a 2-chloroallyl radical and R' represents a halogen substituted lower monoolefinic radical.

5. 2 - chloroallyl N-(3-chloro-2-butenyl)-phenyldithiocarbamate.

6. Methyl N-(2-chloroallyl) 3,4-dichlorodithiocarbanilate.

7. 2-chloroallyl N-(2-chloroallyl) 3,4-dichlorodithiocarbanilate.

8. 2 - bromoallyl N-(2-chloroallyl)-3,4-dichlorodithiocarbanilate.

9. Allyl N-(2-chloroallyl) - 3,4 - dichlorodithiocarbanilate.

10. A herbicidal composition comprising a major proportion of a carrier and a minor phytotoxic proportion of the compound of the structure

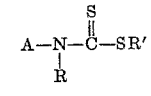

where A represents an aryl group selected from the group consisting of phenyl and halogen substituted phenyl, R represents a halogen substituted lower monoolefinic group and R' is a radical selected from the group consisting of lower alkyl, lower monoolefinic and halogen substituted lower monoolefinic.

11. A herbicidal composition comprising a major proportion of a carrier and a minor phytotoxic proportion of the compound of the structure

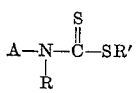

where A represents chloro substituted phenyl, R represents a halogen substituted lower mone-olefinic radical and R' represents a lower alkyl radical.

12. A herbicidal composition comprising a major proportion of a carrier and a minor phytotoxic proportion of the compound of the structure

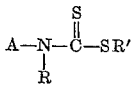

where A represents a halogen substituted phenyl group, R represents a halogen substituted lower monoolefinic radical and R' represents a lower monoolefinic radical.

13. A herbicidal composition comprising a major proportion of a carrier and a minor phytotoxic proportion of the compound of the structure

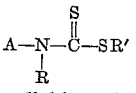

where A represents a dichlorophenyl radical, R represents a 2-chloroallyl radical and R' represents a halogen substituted lower monoolefinic radical.

14. A method of controlling vegetation which comprises applying thereto a phytotoxic concentration of a compound of the structure

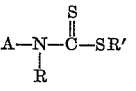

where A represents an aryl group selected from the group consisting of phenyl and halogen substituted phenyl, R represents a halogen substituted lower monoolefinic group and R' is a radical selected from the group consisting of lowel alkyl, lower monoolefinic and halogen substituted lower monoolefinic.

15. A method of controlling vegetation which comprises applying thereto a phytotoxic concentration of a compound of the structure

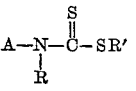

where A represents chloro substituted phenyl, R represents a halogen substituted lower mono-olefinic radical and R' represents a lower alkyl radical.

16. A method of controlling vegetation which comprises applying thereto a phytotoxic concentration of a compound of the structure

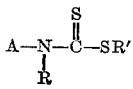

where A represents a halogen substituted phenyl group, R represents a halogen substituted lower mono-olefinic radical and R' represents a lower monoolefinic radical.

17. A method of controlling vegetation which comprises applying thereto a phytotoxic concentration of a compound of the structure

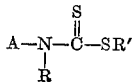

where A represents a dichlorophenyl radical, R represents a 2-chloroallyl radical and R' represents a halogen substituted lower monoolefinic radical.

References Cited in the file of this patent

UNITED STATES PATENTS

| | | |
|---|---|---|
| Re. 22,750 | Tisdale et al. | Apr. 30, 1946 |
| 2,127,375 | Bousquet | Aug. 16, 1938 |
| 2,535,877 | Stewart | Dec. 26, 1950 |
| 2,744,898 | Harman et al. | May 8, 1956 |
| 2,766,554 | Dorman | Oct. 16, 1956 |
| 2,854,467 | Harman et al. | Sept. 30, 1958 |
| 2,863,899 | Harris | Dec. 9, 1958 |
| 2,893,856 | Hamm | July 7, 1959 |
| 2,919,182 | Harmon et al. | Dec. 29, 1959 |

FOREIGN PATENTS

| | | |
|---|---|---|
| 205,460 | Australia | Jan. 16, 1957 |
| 858,352 | Germany | Dec. 4, 1952 |

OTHER REFERENCES

Metcalf: "Advances in Pest Control Research," publ. by Interscience Publ., 1957, pages 67 and 68.

Plant Regulators, page 27, Chemical-Biological Coordination Center Positive Data Series, No. 2, June 1955.